United States Patent
Little

(10) Patent No.: US 8,104,836 B2
(45) Date of Patent: Jan. 31, 2012

(54) ARTICULATING HEADREST MECHANISM

(75) Inventor: Mark Little, Maidstone (CA)

(73) Assignee: Windsor Machine & Stamping (2009) Ltd, Windsor, ON (CA)

( * ) Notice: Subject to any disclaimer, the term of this patent is extended or adjusted under 35 U.S.C. 154(b) by 149 days.

(21) Appl. No.: 11/780,366

(22) Filed: Jul. 19, 2007

(65) Prior Publication Data

US 2008/0036263 A1 Feb. 14, 2008

Related U.S. Application Data

(60) Provisional application No. 60/807,767, filed on Jul. 19, 2006, provisional application No. 60/827,375, filed on Sep. 28, 2006.

(51) Int. Cl.
*A47C 7/38* (2006.01)
(52) U.S. Cl. .................................. 297/408; 297/409
(58) Field of Classification Search .......... 297/408–410
See application file for complete search history.

(56) References Cited

U.S. PATENT DOCUMENTS

| 5,380,060 | A | * | 1/1995 | Sponsler et al. | 297/238 |
| 5,570,931 | A | * | 11/1996 | Kargilis et al. | 297/378.12 |
| 5,971,467 | A | * | 10/1999 | Kayumi et al. | 296/66 |
| 7,325,877 | B2 | * | 2/2008 | Brockman et al. | 297/408 |
| 2005/0242640 | A1 | * | 11/2005 | Barko et al. | 297/238 |
| 2007/0152487 | A1 | * | 7/2007 | Brockman et al. | 297/408 |

* cited by examiner

*Primary Examiner* — David Dunn
*Assistant Examiner* — Erika Garrett
(74) *Attorney, Agent, or Firm* — Quinn Law Group, PLLC

(57) ABSTRACT

A foldable seat headrest assembly including a locking mechanism that includes a lock lever that can be manipulated by a manual release handle that selectively locks the headrest pad component against a groove formed in a portion of a lock post so as to keep the headrest assembly in an upright position. The groove provides both a back stop and a forward stop for the lock lever. When the lock lever is disengaged from the groove by manipulating the release handle in a downward motion, a dump spring allows the headrest portion to assume a folded or dumped position. In the folded or dumped position, the headrest portion fits compactly against the back portion of the seat. The manual release handle can be associated with either the left or the right side of the headrest assembly allowing the same assembly to be used on either side of a vehicle, e.g., the driver or passenger side of the vehicle, as well in the front and rear seats.

28 Claims, 6 Drawing Sheets

ARTICULATING HEADREST MECHANISM

CROSS-REFERENCE TO RELATED APPLICATION

The instant application claims priority to U.S. Provisional Patent Application Ser. No. 60/807,767, filed Jul. 19, 2006, and U.S. Provisional Patent Application Ser. No. 60/827,375, filed Sep. 28, 2006, the entire specifications of both of which are expressly incorporated herein by reference.

FIELD OF THE INVENTION

The subject invention generally relates to headrests for seats, and more specifically to a headrest assembly that allows for selective rotation of the assembly up to approximately 150 degrees downwardly towards a back portion of the seat and includes a locking mechanism having a groove portion that provides both a front stop surface and a back stop surface for a locking member selectively insertable therein.

BACKGROUND OF THE INVENTION

Headrests situated on the top of vehicle seats provide comfort for an occupant and simultaneously offer protection from injuries such as whiplash. However, the headrest introduces a problem in vehicles in that they decrease the forward viewing area of any rear seat occupants (e.g., through the front windshield) and present an obstacle to the front seat occupants, especially the driver, when viewing the rear view mirrors (e.g., referring to the headrests located on the rear seats).

Additionally, the headrest is a seat extension by design, thus adding to the volume occupied by the seat, and thereby subtracts from the available cargo space in a vehicle. This can be a potential problem when attempting to load large or irregularly shaped cargo (e.g., lumber, skis and/or the like) into the interior of the vehicle, which can have a tendency to strike the headrest and cause damage thereto.

For this reason, certain seats of the past have been designed with removable headrests. However, a detached headrest may be lost or damaged. Other seats were designed without headrests, which effectively discarded the safety and ergonomic benefits provided by the headrest. Finally, some recent seat designs have included a selectively foldable headrest, such as found in commonly-assigned U.S. patent application Ser. No. 11/106,818, the entire specification of which is expressly incorporated herein by reference. However, conventional foldable headrests generally do not fold to a sufficient degree to provide greater occupant comfort/viewability and increased cargo space, and also have locking/unlocking mechanisms for folding the headrest from an upright locked position to a deployed downward or "dumped" position and back again that are very awkward, complicated to use, and are poorly designed.

Additionally, current headrest designs have shown the potential for demonstrating "looseness" or "chuck" when locked in the upright position. Though this does not pose any particular safety concerns, it poses the potential to "rattle" and can also be perceived by the consumer as indicative of overall poor headrest assembly quality. Additionally, foldable headrest designs should be strong and robust enough to withstand a vehicle crash without "dumping" and potentially injuring the occupant.

As such, one of the challenges of conventional headrest designs is to be compliant with applicable safety regulations, such as the upcoming MVSS202A safety standard, which has proven very difficult to meet thus far. This standard has proven to be very difficult to meet so far, especially for folding headrests, because it requires a design to be very rigid and robust, which is difficult to apply to a mechanism in a small area such as a headrest.

Accordingly, there exists a need for a new and improved headrest assembly that overcomes at least one of the aforementioned problems.

SUMMARY OF THE INVENTION

In accordance with the general teachings of the present invention, new and improved headrest assemblies are provided, wherein a folding headrest assembly allows a headrest to selectively fold against a back portion of an automobile seat in a compact stowage configuration. By way of a non-limiting example, the headrest assembly of the present invention can rotate up to approximately 150 degrees such that the headrest assembly can travel from a fully upright and erect position to a folded or dumped position substantially adjacent to the back portion of the seat.

In one aspect of the present invention, the headrest assembly is mounted to the top of a seat, e.g., either in the front, rear, or other position in the vehicle, by posts that support a shaft horizontally above the seat. The headrest portion is attached to bearings and/or bushings for rotating about the axis of the shaft. A locking lever manipulated by a manual release handle optionally locks the headrest pad component against a groove formed in a portion of a lock post so as to keep the headrest assembly in an upright position. The groove thus provides both a back stop and a forward stop for the locking lever. When the locking lever is disengaged from the groove by manipulating the release handle in a downward motion, a dump spring allows the headrest portion to assume a folded or dumped position.

In the folded or dumped position, the headrest portion fits compactly against the back portion of the seat for storage. Advantageously, the manual release handle can be associated with either the left or the right side of the headrest assembly allowing the same assembly to be used on either side of a vehicle, e.g., the driver or passenger side of the vehicle.

In accordance with one embodiment of the present invention, a foldable headrest assembly for a seat is provided. The assembly includes: (1) a plate member extending from a distal end to a support end; (2) a seat frame member including a paddle member, the plate member being rotatably supported by the paddle member for rotation about an axis for movement between an upright and a forwardly folded position, wherein the paddle member includes a groove formed therein, wherein the groove includes a first stop surface and a second stop surface; and (3) a latch lever member rotatably supported on one of the plate member and the paddle member for movement between a latched position engaging the groove of the paddle member for preventing folding movement from the upright position toward the forwardly folded position and for movement of the latch lever member to disengage the groove of the paddle member to an unlatched position allowing such folding movement.

In accordance with another embodiment of the present invention, a first alternative foldable headrest assembly for a seat is provided. The first alternative assembly includes: (1) a support member extending from a distal end to a support end; (2) a plate member extending from the distal end; (3) a seat frame member including a paddle member, the plate member being rotatably supported by the paddle member for rotation about an axis for movement between an upright and a forwardly folded position, wherein the paddle member includes a groove formed therein, wherein the groove includes a first stop surface and a second stop surface; and (3) a latch lever member rotatably supported on one of the plate member and the paddle member for movement between a latched position engaging the groove of the paddle member for preventing folding movement from the upright position toward the forwardly folded position and for movement of the latch lever member to disengage the groove of the paddle member to an unlatched position allowing such folding movement.

In accordance with still another embodiment of the present invention, a second alternative foldable headrest assembly for a seat is provided. The assembly includes: (1) a first support member extending from a first distal end to a first support end; (2) a second support member spaced from the first support member and extending from a second distal end to a second support end for supporting a headrest between the support ends; (3) a first plate member extending from the first distal end; (4) a second plate member extending from the second distal end; (5) a seat frame member including a first paddle member and a second paddle member spaced from the first paddle member, the second plate member being rotatably supported by the second paddle member on the axis for movement in unison with the first plate member between an upright and a forwardly folded position, wherein the first paddle member includes a groove formed therein, wherein the groove includes a first stop surface and a second stop surface; and (6) a latch lever member rotatably supported on one of the first plate member and the first paddle member for movement between a latched position engaging the groove of the first paddle member for preventing folding movement from the upright position toward the forwardly folded position and for movement of the latch lever member to disengage the groove of the first paddle member to an unlatched position allowing such folding movement.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE INVENTION

Figure 1:
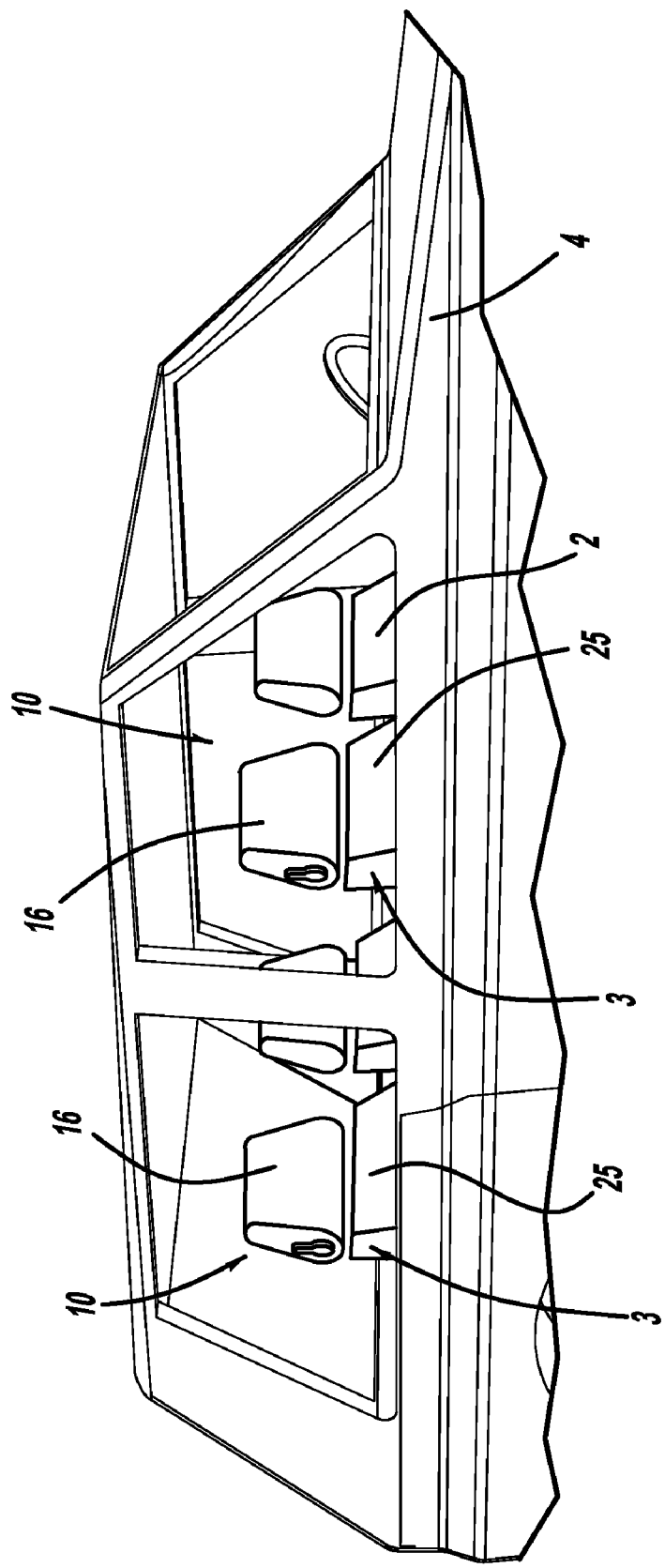
FIG. 1 is a partial perspective view of a vehicle including a plurality of headrest assemblies mounted on the front and rear seats in the raised position.

The following description of the preferred embodiment(s) is merely exemplary in nature and is in no way intended to limit the invention, or uses.

Referring generally to FIGS. 1-5, there is shown a folding headrest system 10 in an upright or erect position on either a driver seat 2 or passenger seat 3 of a vehicle 4. In FIGS. 2-5, the movable pad component 16 surrounding the folding headrest system 10 is shown in phantom but would look very similar to the movable pad component 16 depicted in FIG. 1.

Figure 2:
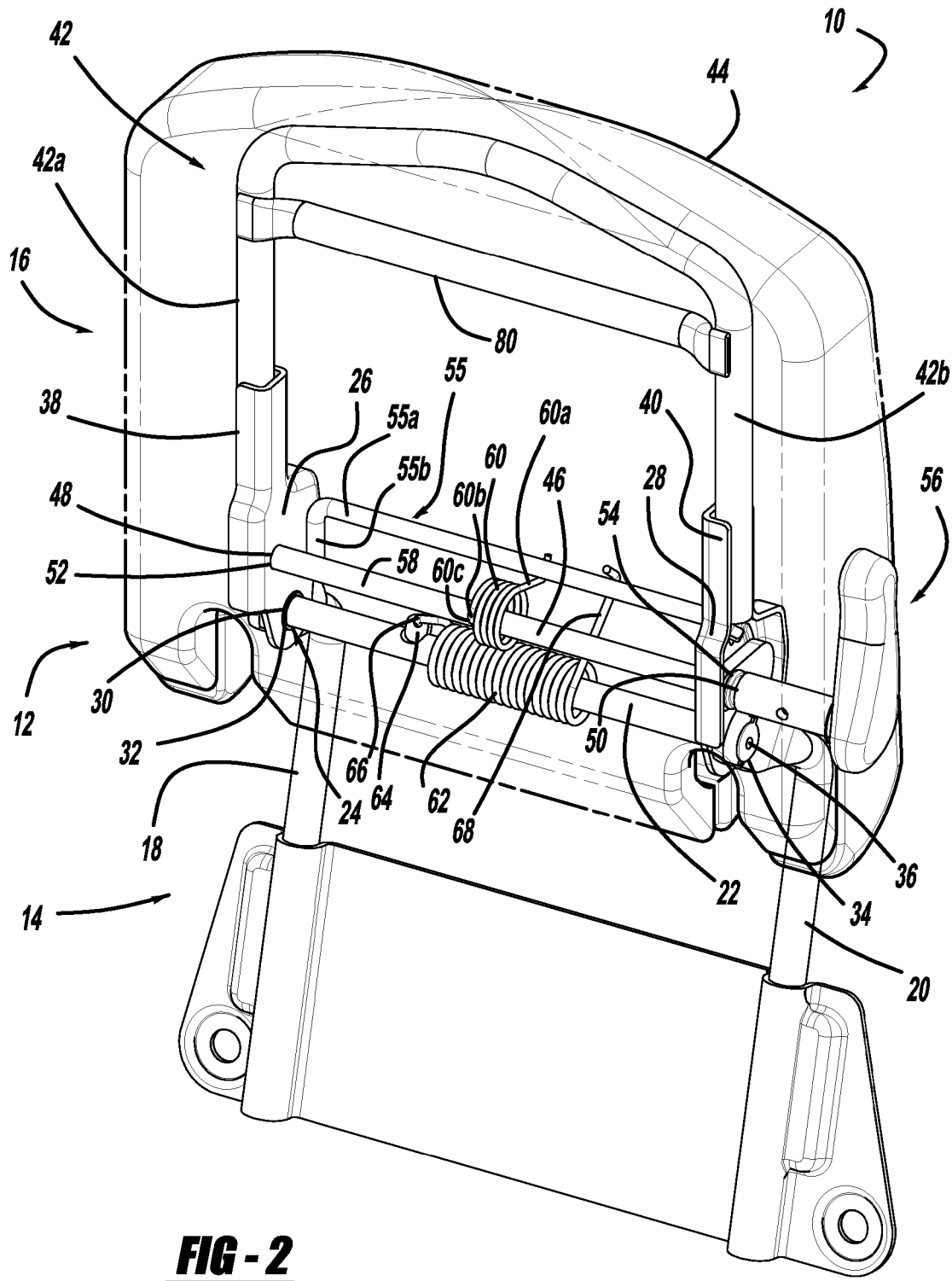
FIG. 2 is a front perspective view of a headrest assembly mounted on a driver seat in the raised position.
Figure 3:
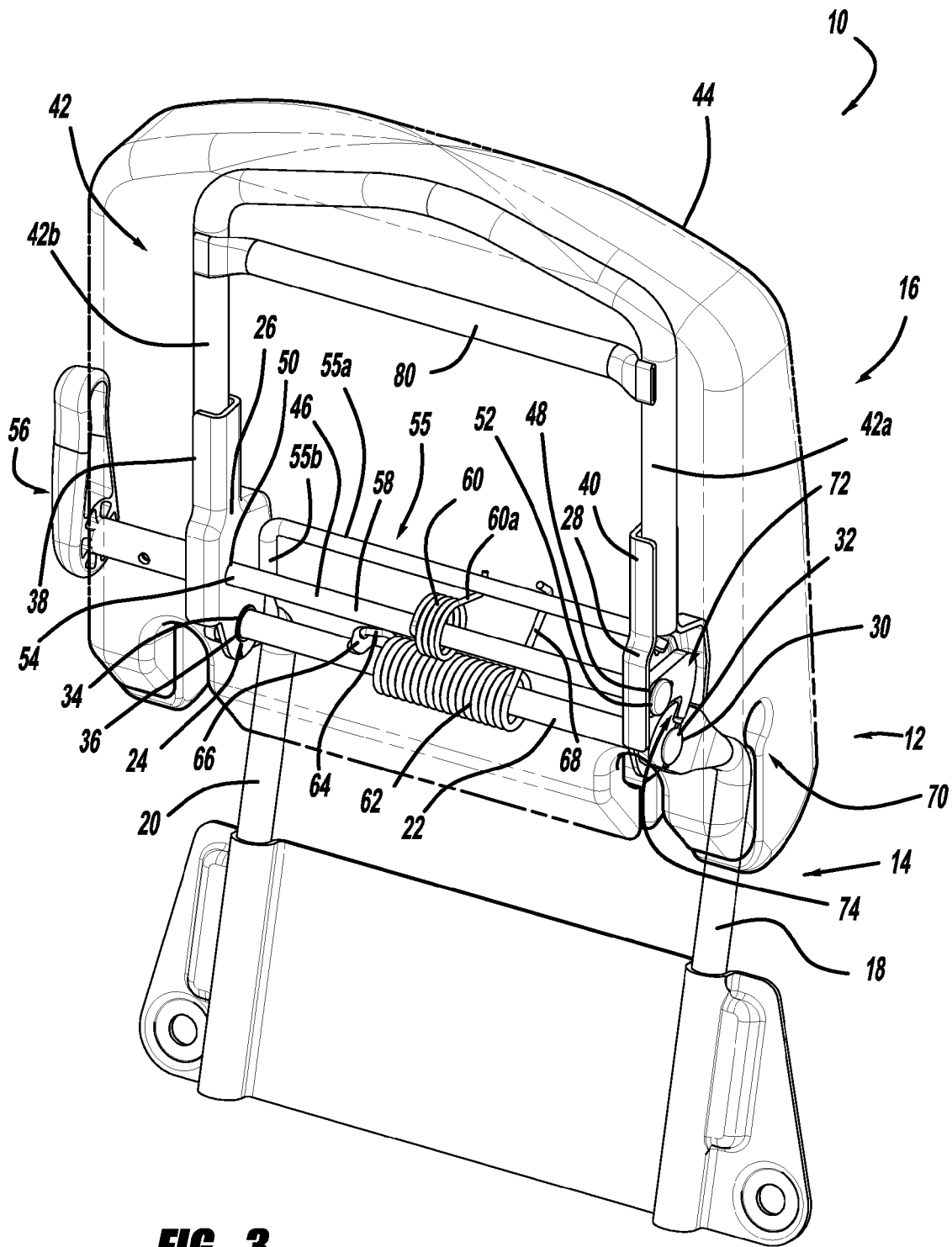
FIG. 3 is a front perspective view of a headrest assembly mounted on a passenger seat in the raised position.

FIG. 2 depicts a front perspective view of a folding headrest assembly 12 that is mounted to a driver seat of the vehicle. FIG. 3 also depicts the folding headrest assembly 12; however, the headrest assembly 12 is shown mounted on the passenger seat of a vehicle in an upright or erect position. It should be appreciated that the headrest assemblies of the present invention can also easily be mounted onto passenger seats as well as driver seats. Accordingly, the designation of "driver," "passenger," "front," "rear," "left", "right," or other seat locations are meant to be for solely for reference purposes only and are not intended to be limiting in any manner.

The headrest assembly 12 includes a mounting component 14 that pivotally supports a movable pad component 16. The mounting component 14 includes a left side lock post or seat frame 18 and a right side lock post or seat frame 20 for fixedly suspending a metal shaft 22 (e.g., a pivot shaft) inside keyed holes 24 in a horizontal position above a seat 25. Preferably, the lock posts 18, 20, respectively, are formed of a metallic material and are adapted to be received within apertures formed in a top surface of a seat, e.g., a front seat, rear seat and/or the like. Paddle shaped members 18a, 20a, respectively can be formed on end portions of lock posts 18, 20, respectively, e.g., for facilitating attachment of the lock posts 18, 20, respectively, to other components of headrest assembly 12.

The movable pad component 16 pivots about the shaft 22 by means of a slave movable stamping or plate 26 and a lock movable stamping or plate 28, preferably comprised of a metallic material. The slave movable stamping 26 has a shaft hole 30 for receiving a bushing 32 (e.g., a bronze bushing) that rotates about one end of the shaft 22. Likewise, the lock movable stamping 28 has a shaft hole 34 for receiving a bushing 36 (e.g., a bronze bushing) that rotates about the other end of the shaft 22. Frame channels 38, 40, respectively, on top of both movable stampings 26, 28, respectively, suspend a headrest frame 42 that supports a headrest pad 44 (shown in phantom in some views). Therefore, the headrest pad 44 rotates about the axis of the shaft 22 on the movable stampings 26, 28, respectively.

A lever pivot pin 46 (e.g., a lock lever shaft or rod) is rotatably disposed between the movable stampings 26, 28, respectively, each end thereof being received in holes 48, 50, respectively formed in the movable stampings, 26, 28, respectively. Bushings (e.g., bronze bushings) 52, 54, respectively, are received in holes 48, 50, respectively, and in turn receive an end of the lever pivot pin 46. A headrest brace 55 (e.g., which can function as a second lock lever shaft or rod), includes an elongated member 55a extending parallel to the lever pivot pin 46 and end members 55b operably associated with the movable stampings 26, 28, respectively. A handle or release member 56 cooperates with the lever pivot pin 46 and includes an elongated portion 58 that extends substantially the entire length of the lever pivot pin 46.

A catch spring 60 is operably associated with the elongated portion 58 (e.g., one end thereof could be received in an aperture formed in the elongated portion 58) and a hook-shaped free end 60a thereof extends around a portion of the headrest brace 55, e.g., the elongated member 55a. The other end 60b (e.g., an ear portion) of the catch spring 60 can be received in an aperture 60c formed on the elongated portion 58.

A dump spring 62 includes a first end 64 (e.g., an ear portion) that is disposed in an aperture or hole 66 formed on the shaft 22 and a second hook-shaped free end 68 that is disposed about the headrest brace 55 (e.g., the elongated member 55a) and the elongated portion 58 so as to create a downward rotational force that encourages the movable pad component 16 to rotate downward into a folded configuration, as will be explained herein.

Figure 7:
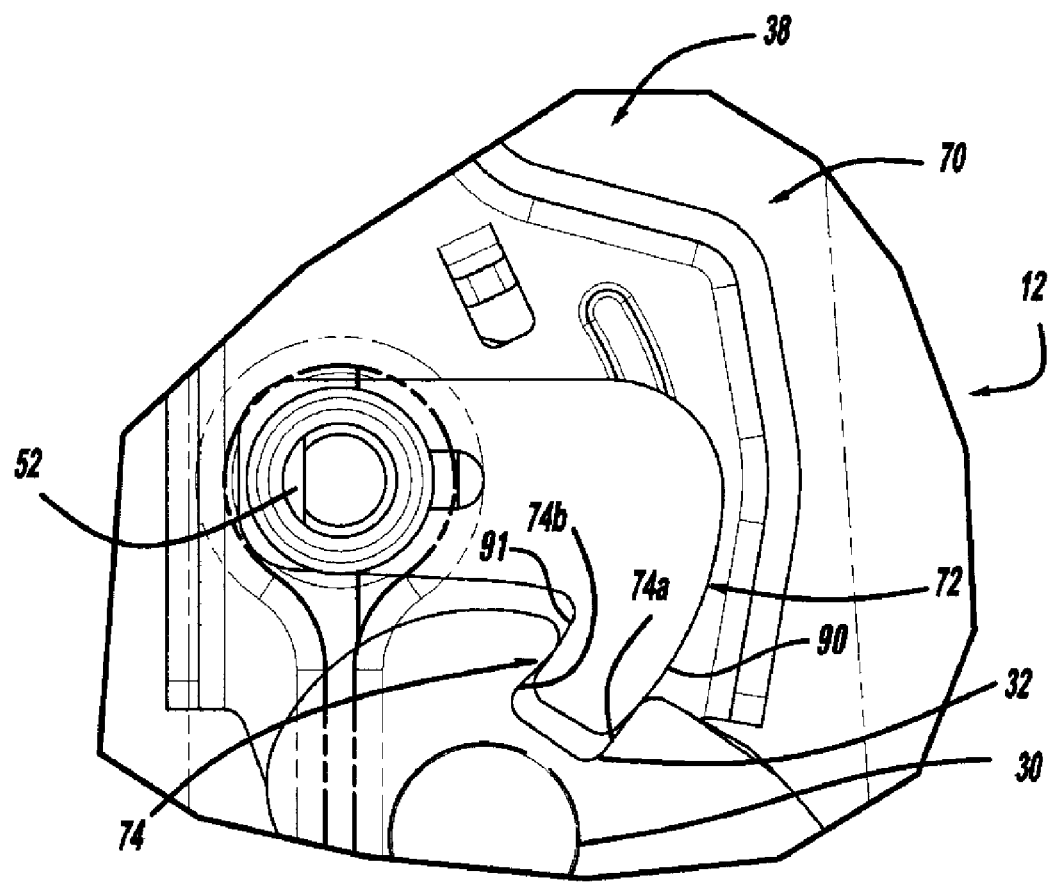
FIG. 7 is a partial elevational view of a locking mechanism for the headrest assembly.

In order to keep the movable pad component 16 in the upright and erect position, it is necessary to provide a mechanism that overcomes the tendency of the movable pad component 16 from rotating downwardly due to the biasing force of the dump spring 62. The present invention provides a locking mechanism 70 that cooperates with a portion of one of the lock posts, e.g., either the left side lock post 18 and/or the right side lock post 20, e.g., as shown in FIG. 7.

The locking mechanism 70 includes a generally L-shaped latch or lock lever 72 that is configured so as to be received in a generally C-shaped groove 74 formed in a surface of one of the lock posts, e.g., the left side lock post 18 and/or the right side lock post 20. The groove 74 thus provides both a back stop 74a and a forward stop 74b for the lock lever 72. This feature of the present invention, i.e., providing both back and forward stops, provides a more robust and comprehensive safety mechanism to prevent inadvertent deployments (i.e., dumps) of the headrest assembly 12, especially the movable pad component 16, as compared to conventional designs.

Figure 6:
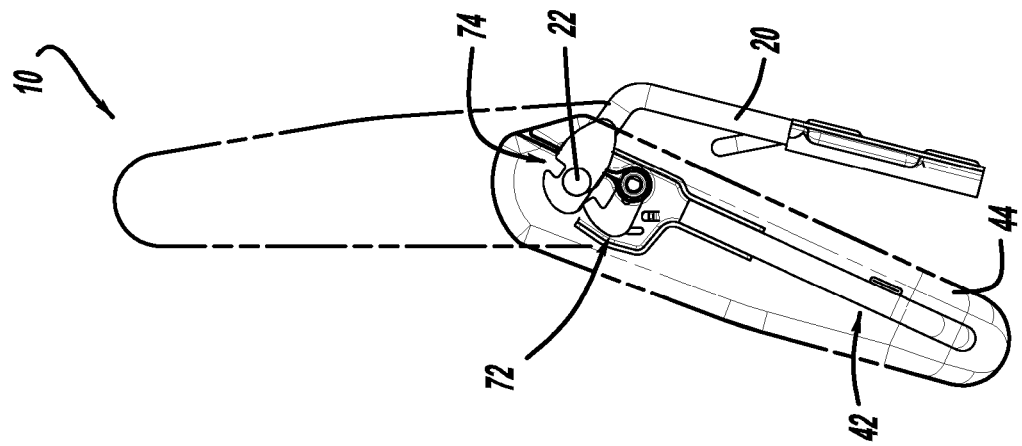
FIG. 6 is a side view of a headrest assembly mounted on a seat in the lowered position.
Figure 5:
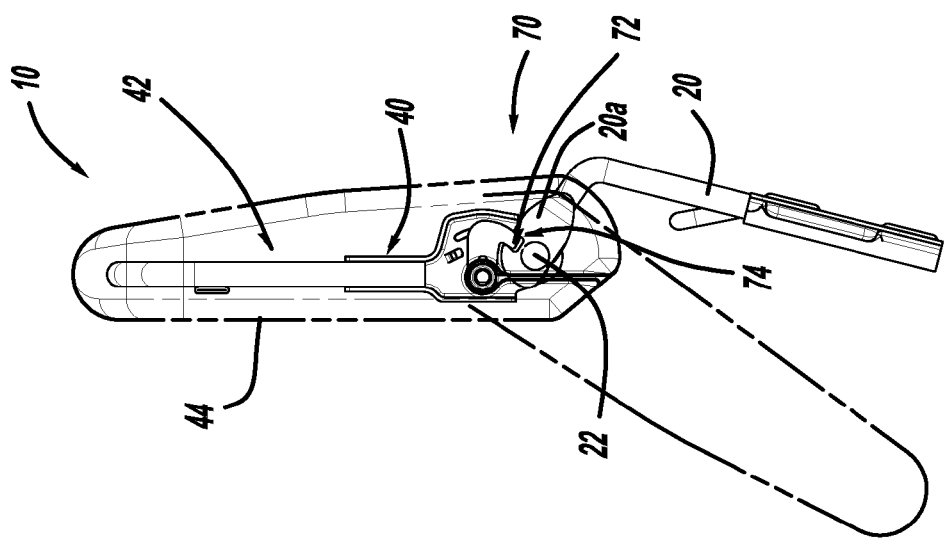
FIG. 5 is a right side view of a headrest assembly mounted on a seat in the raised position.
Figure 4:
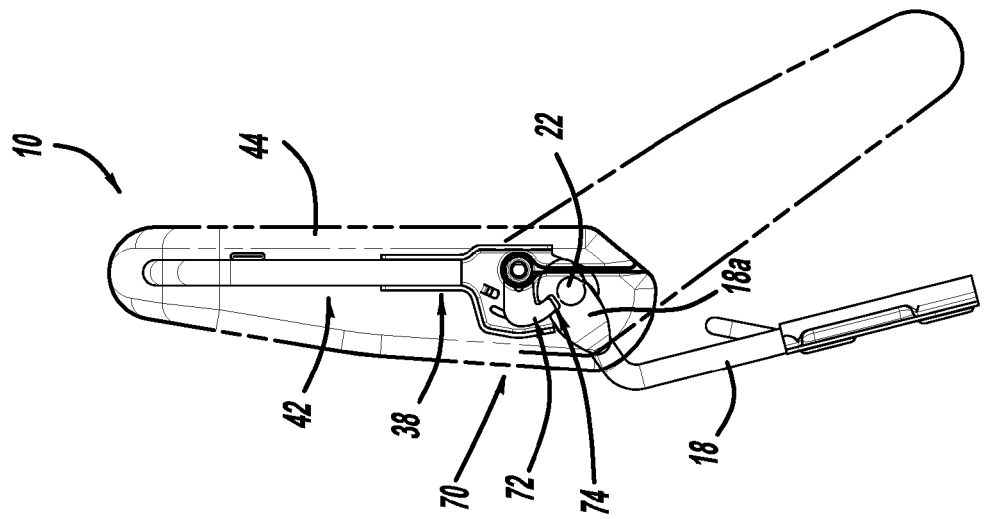
FIG. 4 is a left side view of a headrest assembly mounted on a seat in the raised position.

In one aspect of the present invention, the handle 56 cooperates with the lock lever 72 such that when the handle 56 moves in a particular direction, the lock lever 72 also moves in the same direction. Accordingly, when it is desired to disengage the lock lever 72 from the groove 74 so as to enable the movable pad component 16 to assume a deployed, folded or dumped position, e.g., as shown in FIG. 6, the handle 56 is rotated downwardly, e.g., toward the back portion of the seat, thus forcing the lock lever 72 out of the groove 74, thus allowing the dump spring 62 to force the lever pivot pin 46 and correspondingly the headrest brace 55 to also rotate downwardly. In this manner, the movable pad component 16 is forced to rotate such that it assumes a folded or dumped position so as to cause it to contact or nearly contact the back portion of the seat.

The degree of rotation of the movable pad component 16 can vary; however, in accordance with one aspect of the present invention, the movable pad component 16 can rotate up to approximately 150 degrees, e.g., from its upright and erect position to its fully folded position. In this manner, visibility is improved for the occupants of the vehicle and cargo space is increased.

Optionally, a pair of rotational stop pins (not shown) can be provided so as to selectively engage a portion of the system 10 when it is in folded or dumped position, e.g., be engaging a surface of the movable stampings, 26, 28, respectively. In this manner, the total amount of rotational movement permitted by the system 10 can be controlled within predetermined limits.

Additionally, an optional cross support tube 80 can be provided between the arms or support members 42a, 42b, respectively, of the headrest frame 42, thus increasing the structural rigidity of the assembly 10 and providing greater support to the headrest pad 44.

Many modifications and variations of the present invention are possible in light of the above teachings. For example, a headrest assembly may be mounted inside the seat or above the seat. The headrest pad structure and posts may be adapted along with other assembly parts to suit the unique requirements of a particular vehicle. Further, the headrest assembly may be used in non-automotive domains and could be adapted for use on any folding seat design. Finally, materials may be modified as necessary.

Figure 8:
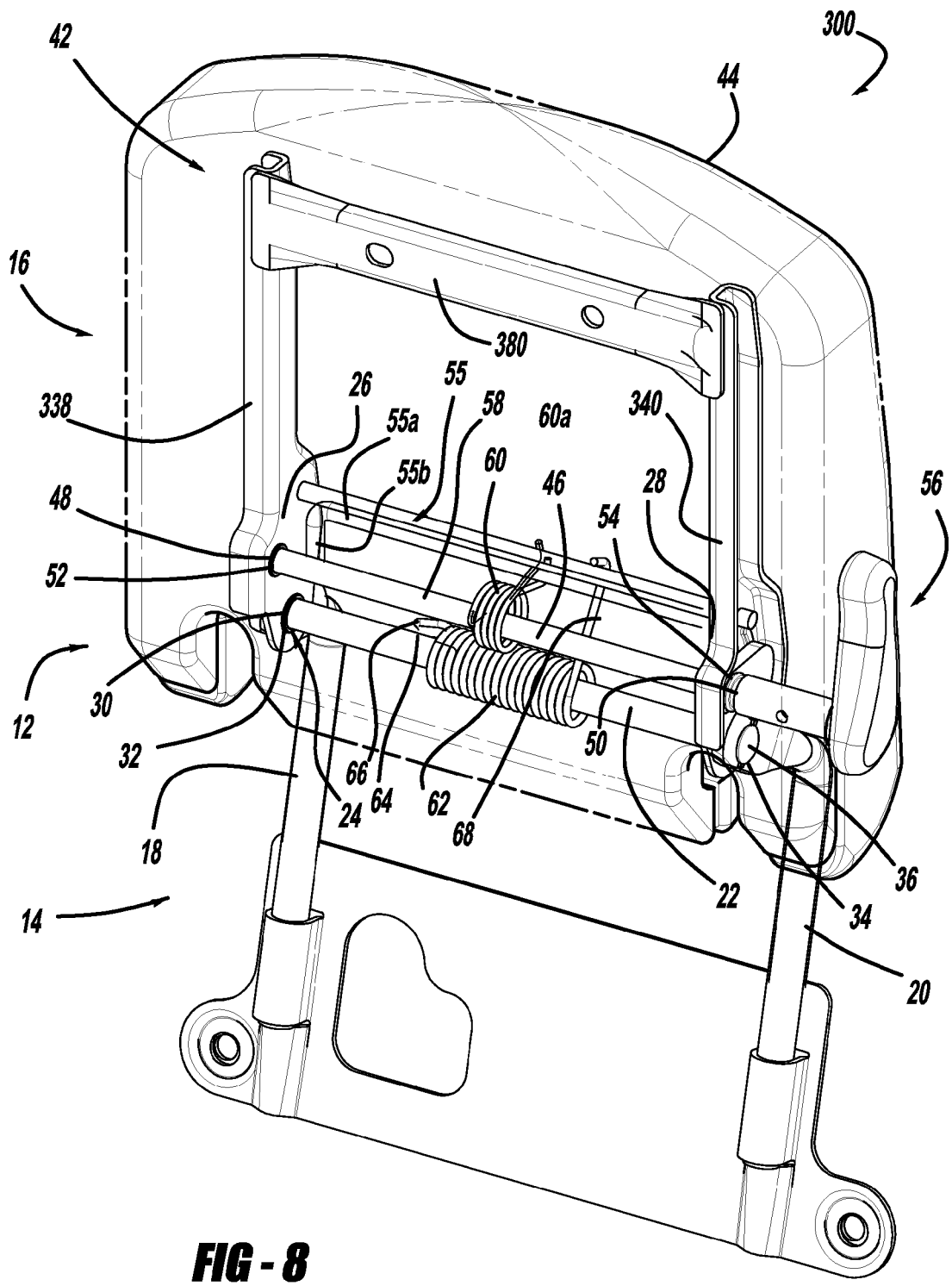
FIG. 8 is a front perspective view of an alternative headrest assembly mounted on a passenger seat in the raised position.

Referring to FIG. 8, there is shown a front perspective view of an alternative headrest assembly 300 mounted on a passenger seat in the raised position. However, it should be appreciated that the alternative headrest assembly 300 can be mounted on a driver seat, as well as any rear seats. This embodiment is very similar to the embodiment depicted in FIG. 3; however, the frame channels 338, 340, respectively, have been elongated so as to obviate the need for any arms (e.g., arms 42a, 42b, respectively, as shown in FIG. 3) mounted thereto.

As with the embodiment depicted in FIG. 3, an optional cross support tube 380 can be provided between the elongated portions of the arms 42a, 42b, respectively, of the frame channels 338, 340, respectively, thus increasing the structural rigidity of the assembly 300 and providing greater support to the headrest pad 44. The function of the assembly 300 is substantially identical to that of the previously described embodiments, in that it is capable of assuming a folded or dumped position, e.g., in response to the manipulation of the handle 56 such that the lock lever 72 is lifted out of the groove 74.

Referring again to FIG. 7, the back stop 74a and the forward stop 74b are substantially parallel with one another. The lock lever 72 includes a first surface 90 and a second surface 91. The first surface 90 is an arc and the second surface 91 is an arc.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A foldable headrest assembly for a seat, comprising:
a plate member extending from a distal end to a support end;
a seat frame member including a paddle member, said plate member being rotatably supported by said paddle member for rotation about an axis for movement between an upright and a forwardly folded position;
wherein said paddle member includes a groove formed therein, wherein said groove includes a first stop surface and a second stop surface; and
a latch lever member rotatably supported on one of said plate member and said paddle member for movement between a latched position engaging said groove of said paddle member for preventing folding movement from said upright position toward said forwardly folded position and for movement of said latch lever member to disengage said groove of said paddle member to an unlatched position allowing such folding movement;
wherein the latch lever member and the groove are configured such that the latch lever member contacts both the first stop surface and the second stop surface simultaneously when the latch lever member is in the latched position; and
wherein the first stop surface and the second stop surface are substantially parallel to one another.

2. The invention according to claim 1, further comprising:
a first support member extending from a first distal end to a first support end; and
a second support member spaced from said first support member and extending from a second distal end to a second support end for supporting a headrest between said support ends.

3. The invention according to claim 2, further comprising a second plate member extending from said second distal end.

4. The invention according to claim 3, wherein said seat frame member further comprises a second paddle member spaced from said paddle member, said first plate member being rotatably supported by said first paddle member for rotation about an axis, said second plate member being rotatably supported by said second paddle member on said axis for movement in unison with said first plate member between an upright and a forwardly folded position.

5. The invention according to claim 4, further comprising a shaft member extending between and supported by said paddle member and said second paddle member on said axis.

6. The invention according to claim 5, wherein said shaft member includes an ear portion extending from said shaft member in a transverse direction to said axis and said ear portion defines an aperture.

7. The invention according to claim 6, wherein said release member includes a latch handle extending between and rotatably supported by one of said plate member and said rod member.

8. The invention according to claim 7, further comprising a second rod member spaced from and parallel to said rod member, wherein said second end of said biasable member engages said second rod member for biasing said plate member and said second plate member toward said forwardly folded position.

9. The invention according to claim 8, further comprising a second biasable member having a first end and a second end, said second biasable member reacting between said rod member and said second rod member, wherein said second end engages said second rod member for biasing said plate member and said second plate member toward said forwardly folded position.

10. The invention according to claim 6, further comprising a rod member connected to and extending between said plate member and said second plate member, wherein said rod member is spaced apart from and parallel to said shaft member.

11. The invention according to claim 10, further comprising a biasable member having a first end and a second end, wherein said first end engages through said aperture of said ear portion and said second end engages said rod member for biasing said plate member and said second plate member toward said forwardly folded position.

12. The invention according to claim 1, further comprising a release member for selectively rotating said latch lever member to said unlatched position allowing said plate member to rotate about said axis to said forwardly folded position.

13. The invention according to claim 1, wherein said latch lever member is generally L-shaped and said groove defines a generally C-shaped pocket for receiving at least a portion of said latch lever member.

14. A foldable headrest assembly for a seat, comprising:
a support member extending from a distal end to a support end;
a plate member extending from said distal end;
a seat frame member including a paddle member, said plate member being rotatably supported by said paddle member for rotation about an axis for movement between an upright and a forwardly folded position;
wherein said paddle member includes a groove formed therein, wherein said groove includes a first stop surface and a second stop surface; and
a latch lever member rotatably supported on one of said plate member and said paddle member for movement between a latched position engaging said groove of said paddle member for preventing folding movement from said upright position toward said forwardly folded position and for movement of said latch lever member to disengage said groove of said paddle member to an unlatched position allowing such folding movement;
wherein the latch lever member and the groove are configured such that the latch lever member contacts both the first stop surface and the second stop surface simultaneously when the latch lever member is in the latched position; and
wherein the first stop surface and the second stop surface are substantially parallel to one another.

15. The invention according to claim 14, further comprising a second support member spaced from said support member and extending from a second distal end to a second support end for supporting a headrest between said support ends.

16. The invention according to claim 15, further comprising a second plate member extending from said second distal end.

17. The invention according to claim 16, wherein said seat frame member further comprises a second paddle member spaced from said paddle member, said first plate member being rotatably supported by said first paddle member for rotation about an axis, said second plate member being rotatably supported by said second paddle member on said axis for movement in unison with said first plate member between an upright and a forwardly folded position.

18. The invention according to claim 17, further comprising a shaft member extending between and supported by said paddle member and said second paddle member on said axis.

19. The invention according to claim 18, wherein said shaft member includes an ear portion extending from said shaft member in a transverse direction to said axis and said ear portion defines an aperture.

20. The invention according to claim 19, further comprising a rod member connected to and extending between said plate member and said second plate member, wherein said rod member is spaced apart from and parallel to said shaft member.

21. The invention according to claim 19, wherein said release member includes a latch handle extending between and rotatably supported by one of said plate member and said rod member.

22. The invention according to claim 20, further comprising a biasable member having a first end and a second end, wherein said first end engages through said aperture of said ear portion and said second end engages said rod member for biasing said plate member and said second plate member toward said forwardly folded position.

23. The invention according to claim 21, further comprising a second rod member spaced from and parallel to said rod member, wherein said second end of said biasable member engages said second rod member for biasing said plate member and said second plate member toward said forwardly folded position.

24. The invention according to claim 23, further comprising a second biasable member having a first end and a second end, said second bias able member reacting between said rod member and said second rod member, wherein said second end engages said second rod member for biasing said plate member and said second plate member toward said forwardly folded position.

25. The invention according to claim 14, further comprising a release member for selectively rotating said latch lever member to said unlatched position allowing said plate member to rotate about said axis to said forwardly folded position.

26. The invention according to claim 14, wherein said latch lever member is generally L-shaped and said groove defines a generally C-shaped pocket for receiving at least a portion of said latch lever member.

27. A foldable headrest assembly for a seat, comprising:
   a mounting component that is configured for attachment to the seat;
   a headrest frame that is mounted with respect to the mounting component such that the headrest frame is selectively rotatable with respect to the mounting component between a generally upright and a folded position;
   a locking mechanism having a member defining a groove and a latch lever member;
   wherein said groove includes a first stop surface and a second stop surface; and
   said latch lever member being rotatably mounted with respect to the headrest frame for rotation about an axis between a latched position in which the latch lever member simultaneously contacts both the first stop surface and the second stop surface for preventing folding movement from said generally upright position toward said folded position, and an unlatched position allowing such folding movement
   wherein the first stop surface and the second stop surface are substantially parallel to one another.

28. The invention according to claim 27, wherein the latch lever member includes a first surface and a second surface;
   wherein the first surface is an arc; and
   wherein the second surface is an arc.

\* \* \* \* \*